US006668893B2

United States Patent
Hwang (10) Patent No.: US 6,668,893 B2
(45) Date of Patent: Dec. 30, 2003

(54) SYSTEM FOR PRODUCING MICROPOROUS LAMINATED SHEET

(75) Inventor: Kwang Yeun Hwang, Taejon (KR)

(73) Assignee: UPC Co., Ltd. (KR)

( * ) Notice: Subject to any disclaimer, the term of this patent is extended or adjusted under 35 U.S.C. 154(b) by 53 days.

(21) Appl. No.: 09/867,118

(22) Filed: May 29, 2001

(65) Prior Publication Data

US 2002/0142131 A1 Oct. 3, 2002

(30) Foreign Application Priority Data

Jan. 19, 2001 (KR) .......................................... 2001-3221

(51) Int. Cl.[7] .............................................. B32B 31/08
(52) U.S. Cl. ....................... 156/494; 156/291; 156/555; 156/582; 156/543; 156/578; 156/229
(58) Field of Search ................................ 156/209, 291, 156/229, 494, 543, 578, 555, 582; 428/315.9, 315.5, 317.9, 138, 198; 442/398, 381; 118/247, 249, 224

(56) References Cited

U.S. PATENT DOCUMENTS

| | | | | |
|---|---|---|---|---|
| 2,342,203 A | * | 2/1944 | Kohler | ........................ 118/235 |
| 4,610,743 A | * | 9/1986 | Salmeen et al. | ............. 156/183 |
| 4,960,050 A | * | 10/1990 | Hatch | ........................ 101/348 |
| 5,455,111 A | * | 10/1995 | Velasquez Urey | ....... 428/315.5 |
| 5,560,974 A | | 10/1996 | Langley | |
| 5,869,593 A | * | 2/1999 | Helmeke et al. | ............... 528/83 |
| 5,942,062 A | * | 8/1999 | Hassall et al. | ................. 156/87 |
| 6,037,281 A | * | 3/2000 | Mathis et al. | ................ 442/394 |
| 6,139,675 A | * | 10/2000 | Druecke et al. | ............. 156/277 |
| 6,156,421 A | * | 12/2000 | Stopper et al. | .......... 428/315.5 |
| 2002/0077015 A1 | * | 6/2002 | Todt | ........................... 442/394 |

* cited by examiner

Primary Examiner—Michael W. Ball
Assistant Examiner—Jessica Rossi
(74) Attorney, Agent, or Firm—Cantor Colburn LLP (57) ABSTRACT

Disclosed herein is a system for preparing a microporous laminated sheet, which allows a stable breath ability of microporous film to be maintained while making an adhesion of the microporous film excellent. Also, a method of preparing the microporous laminated sheet using the system and a microporous laminated sheet prepared thereby are disclosed. The preparing system includes an adhesive-applying section serving to apply an adhesive in the linear or lattice shape on the microporous film. Also, the microporous laminated sheet includes a microporous film formed from a resin composition comprising 30 to 70% by weight of a polyolefin resin, 1 to 70% by weight of alpha-olefin copolymer, and 20 to 70% by weight of an inorganic filler; a polypropylene reinforcement bonded to one side of the microporous film and serving to reinforce the microporous film; and an adhesive interposed between the microporous film and the reinforcement in a linear or lattice shape and serving to bond the microporous film and the reinforcement to each other.

2 Claims, 9 Drawing Sheets

SYSTEM FOR PRODUCING MICROPOROUS LAMINATED SHEET

BACKGROUND OF THE INVENTION

1. Field of the Invention

The present invention relates in general to a producing system and method of microporous laminated sheets, and microporous laminated sheets produced thereby. More particularly, it relates to a producing system and method of microporous laminates capable of maintaining and improving a breathability of a microporous film while maintaining an excellent adhesion between the microporous film and a non-woven fabric web, and to microporous laminated sheets produced thereby.

2. Description of the Prior Art

As articles permeable to air but impervious to liquids such as water, microporous laminated sheets are generally used. Such microporous laminates have utilities, for example, in disposable articles, such as work-wears to be worn by workers in various working places, infant and senile diapers, feminine sanitary napkins and the like, materials for preventing freezing of a wall or roof, packing materials of fluffs of winter clothes, packing materials for the coloring improvement into a uniform color, for the sugar degree improvement or for the prevention of damages by blight and harmful insects, in fruits or fruit crops, or other industrial applications.

Figure 1:
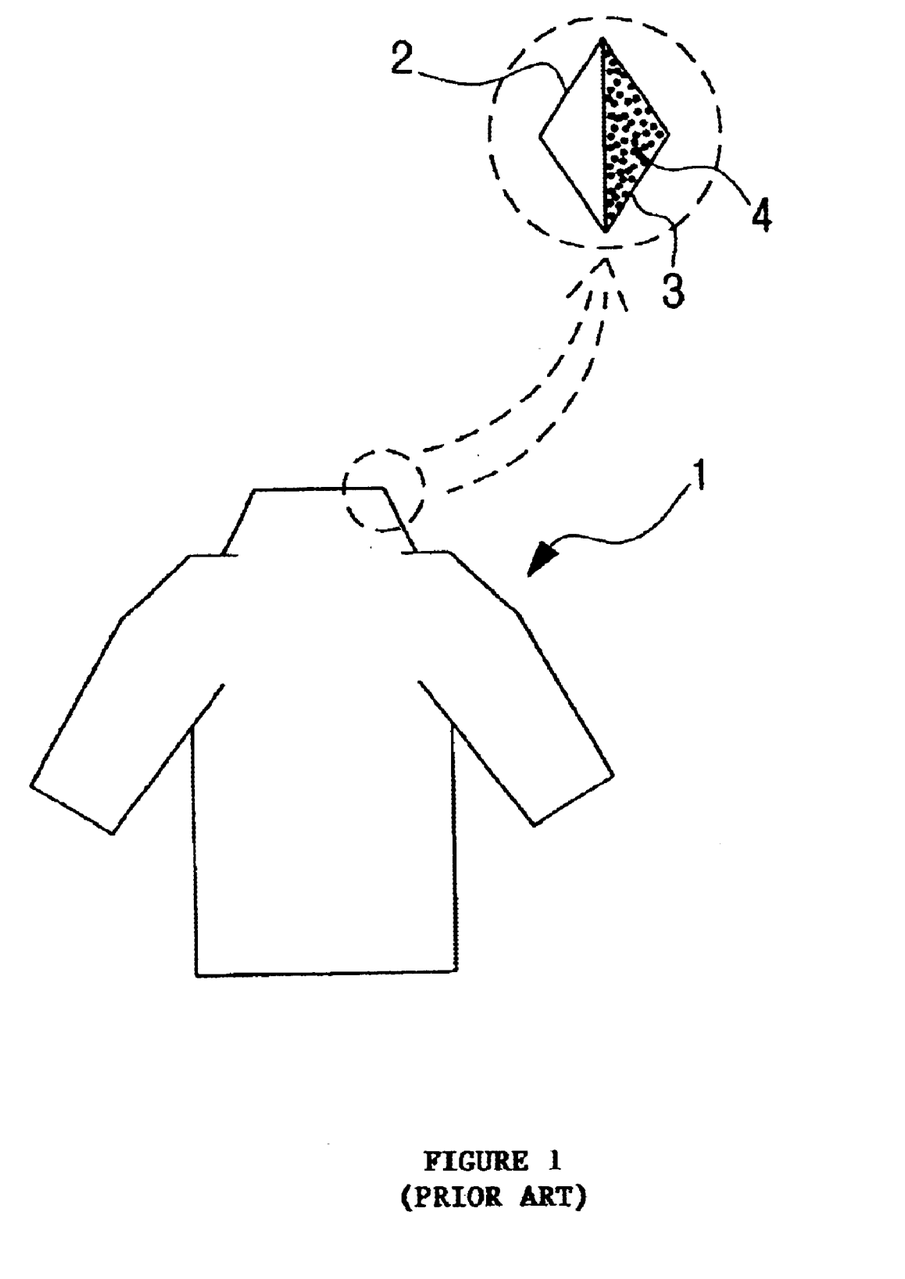
FIG. 1 is a schematic view showing a microporous laminated sheet according to the prior art.

FIG. 1 shows a disposable work-wear 1. In FIG. 1, a non-woven fabric 2 constituting an inner layer of the work-wear 1, and a microporous film 3 bonded to the non-woven fabric 12 are formed of such microporous laminates. Of course, the microporous film 3 has a plurality of microvoids formed therein so that it is permeable to air but is impervious to liquids such as sweat or water.

Figure 2:
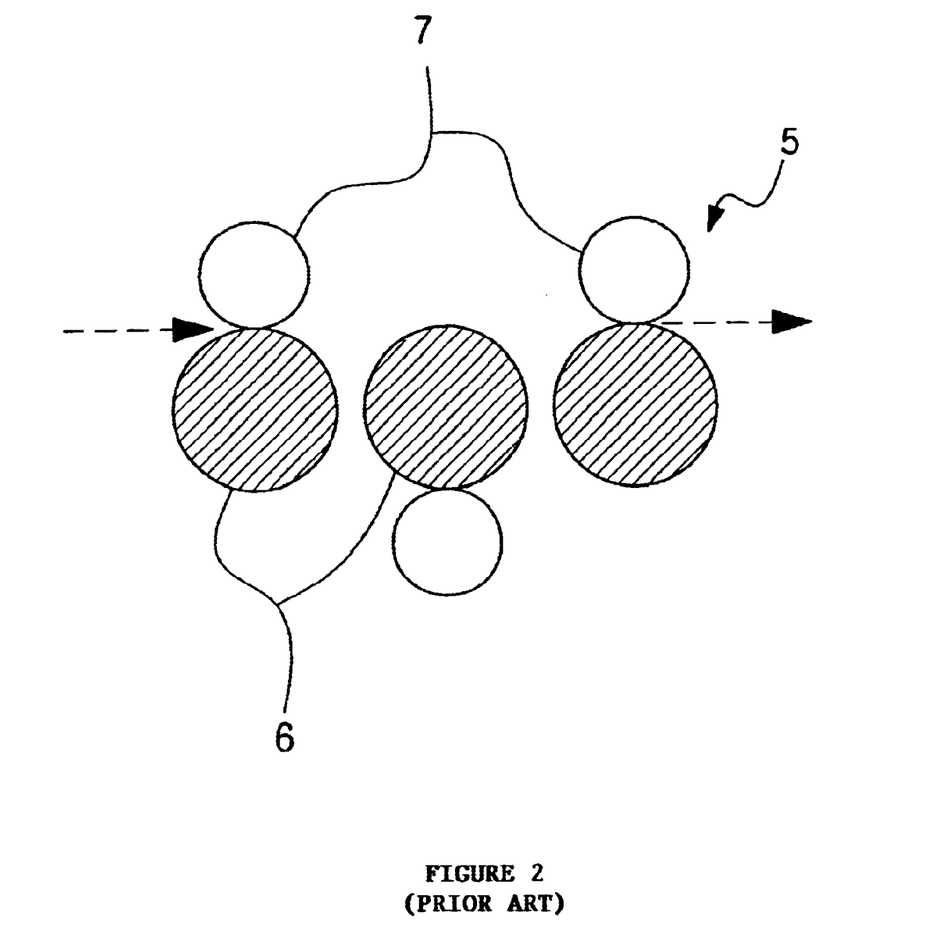
FIG. 2 is a lateral view showing a stretching section in a microporous film-producing section used in the production of the laminated sheet of FIG. 1.

In such microporous laminates, there is used a microporous film pressure-stretched by a stretching section (as shown in FIG. 2) in a microporous film-producing section. The stretching section generally includes a plurality of base rollers 6 through which the microporous film is transported in contact. Also, it includes pressing rollers 7 for pressing the microporous film 3 passing over the respective base rollers 6. Here, the base rollers are coated with chrome, and the pressing rollers 7 are generally formed of an EPM- or EPDM-based material. The respective base rollers 6 are rotated at a speed different from each other and have a faster rotation speed at the input portion of the microporous film than at the output portion. For this reason, the microporous film can be pressed while being transported, thereby being stretched.

However, the stretching section in such a microporous film-producing system is disadvantageous in that it makes a width of the narrow microporous narrow, and also results in a difference in thickness and physical property between the center portion and the edge portion of the microporous film. Also, the stretching section is impossible to control batch wise the pressure and the rotation speed, so that the sliding of the microporous film occurs. This results in the occurrence of a non-stretched portion in the microporous film and results in a disproportion in the microporous film thickness.

Meanwhile, one of prior methods of making the laminated sheets as described above is disclosed in European Patent Publication 0 309 073 A2. According to the method disclosed in this patent, an HDPE-based, mesh-shaped clothes is used as a reinforcement (i.e., a non-woven fabric web), and the microporous film is integrated in the reinforcement by using a heating-pressing manner to form a microporous laminated sheet. In such a method of laminating the microporous film to the HDPE mesh as the reinforcing material by heating pressing, the microporous film which is based on LDPE and LLDPE has a melting point of about 110° C. to 125° C., whereas the non-woven fabric web which is based on HDPE is about 125° C. to 135° C. Accordingly, as the microporous film and the non-woven fabric web have the different melting point, a temperature at which they are laminated to each other needs to be increased to the highest melting point. Where the laminating temperature is increased as such, microvoids of a several $\mu$m to several tens $\mu$m size formed in the microporous film are closed due to the high temperature and pressure applied to the microporous film. For this reason, it has problems in that the breathability is significantly decreased or lost and the laminated sheet is very stiff. As a result, the microporous laminated sheets produced by the heating pressing method have a poor product quality and are unsuitable for use in a work-wear requiring a particularly excellent breathability, such as an industrial dust-proof wear.

Meanwhile, Japanese Patent Publication No. 10511318 discloses a producing method of a microporous laminated sheet for a business work-wear. In this method, a solid adhesive, called the hot melt, which is based on EVA (ethylene vinyl acetic acid) or polyolefin, is melted using an applicator named the hot-melt applicator so as to be converted into the emulsion state. The resulting adhesive is spray applied onto the microporous film or the non-woven fabric as the reinforcement in a melt spraying manner, after which the microporous film or the non-woven fabric are laminated to each other, forming a laminated sheet.

However, in such a laminating method, when the adhesive melted to a desired temperature is spray applied on the surface of the microporous film by the applicator, the adhesive is partially non-uniformly applied. Thus, the adhesion is also partially different throughout the applied surface, so that the uniform adhesion throughout the applied surface is not provided. In addition to this problem, the adhesive is not uniformly applied throughout the surface at a uniform amount when spraying. Thus, at portions which lacks the adhesive, the isolated adhesive portions occur, whereas at portions on which the adhesive is excessively applied, pores in the microporous film are closed with the adhesive to decrease the breathability and also the adhesive is consumed excessively. Furthermore, because of these problems, in the case of the industrial work-wear requiring the launderability, there is resulted in the diffusion of water due to the partial delamination, such that the non-woven fabric and the microporous film are easily separated from each other.

Moreover, in preparing the microporous film, the stretching method employing a change in the linear-velocity of mirror roller plated with chrome is used mainly for the stretching of common polyethylene films having a narrow width. Where this method is applied for the stretching of the microporous film, however, the width of the microporous film to be prepared become very narrow, and also a difference in thickness and physical property between the edge portion and center portion of the film are caused. Additionally, when stretching the microporous film having a wide width in the range of, for example, from 2,000 nm to 3,000 nm, a partial stretching deviation is often caused. This adversely affects the production of a microporous film having an excellent mechanical strength and an excellent and uniform breathability.

SUMMARY OF THE INVENTION

It is therefore a major object of the present invention to provide a system for making a laminated sheet, which allows a breathability of microporous film to be maintained or improved while making an adhesion between the microporous film and reinforcement excellent.

It is other major object of the present invention to provide a method for making a laminated sheet, which allows a breathability of microporous film to be maintained or improved while making an adhesion between the microporous film and the reinforcement excellent.

It is another major object of the present invention to provide a laminated sheet, which has a maintained or improved breathability of microporous film while having an excellent adhesion between the microporous film and the reinforcement.

It is also another major object of the present invention to provide a microporous film-producing system, which includes a stretching section of capable pressing a microporous film to have a generally uniform thickness.

It is still object of the present invention to provide a system and method for making a laminated sheet, which allows a bonding portion between the microporous film and the reinforcement generally uniform and which can prevent an excessive consumption of the adhesive. Also, it is an object of the present invention to provide a laminated sheet produced by these system and method.

It is yet another object of the present invention to provide a system and method for making a laminated sheet using an applying means capable of applying an adhesive uniformly throughout a bond surface of the microporous film and/or the reinforcement. Also, it is an object of the present invention to provide a laminated sheet produced by these system and method.

It is further another object of the present invention to provide a laminated sheet-producing system and method of capable applying a generally uniform pressure to a laminated sheet, and a laminated sheet produced thereby.

The above objects can be achieved by a microporous laminated sheet-producing system for bonding a microporous film to a reinforcement, which comprises a microporous film-feeding section serving to feed the microporous film; a reinforcement-feeding section around which the reinforcement to be bonded to the microporous film is wound unwindably; an adhesive-applying section serving to apply an adhesive in a linear or lattice shape, on the microporous film fed from the microporous film-feeding section; a drying chamber serving to dry the microporous film applied with the adhesive; a laminating section serving to bond the microporous film discharged from the drying chamber and the reinforcement to each other; and a winding section to collect a laminated sheet from the laminating section.

Also, the above objects can be achieved by a microporous laminated sheet-producing method for bonding a microporous film to a reinforcement, which comprises the steps of: feeding a microporous film; feeding a reinforcement to be bonded to one side of the microporous film; applying an adhesive on the microporous film in a linear or lattice shape; drying the microporous film applied with the adhesive; bonding adhesively the reinforcement to one side of the dried microporous film to form a laminated sheet; and winding the laminated sheet.

Also, the above objects can be achieved by a microporous laminated sheet which comprises a microporous film formed from a resin composition comprising 30 to 70% by weight of a polyolefin resin, 1 to 70% by weight of alpha-olefin copolymer, and 20 to 70% by weight of an inorganic filler; a polypropylene-based reinforcement bonded to one side of the microporous film and serving to reinforce the microporous film; and an adhesive interposed between the microporous film and the reinforcement in a linear or lattice shape and serving to bond the microporous film and the reinforcement to each other.

BRIEF DESCRIPTION OF THE DRAWING

The above and other objects and aspects of the invention will be apparent from the following description of embodiments with reference to the accompanying drawings, in which.

DETAILED DESCRIPTION OF THE INVENTION

Preferred embodiments of a microporous laminated sheet-making system and method according to the present invention, and a microporous laminated sheet produced thereby will now be described in detail with reference to the accompanying drawings.

Figure 3:
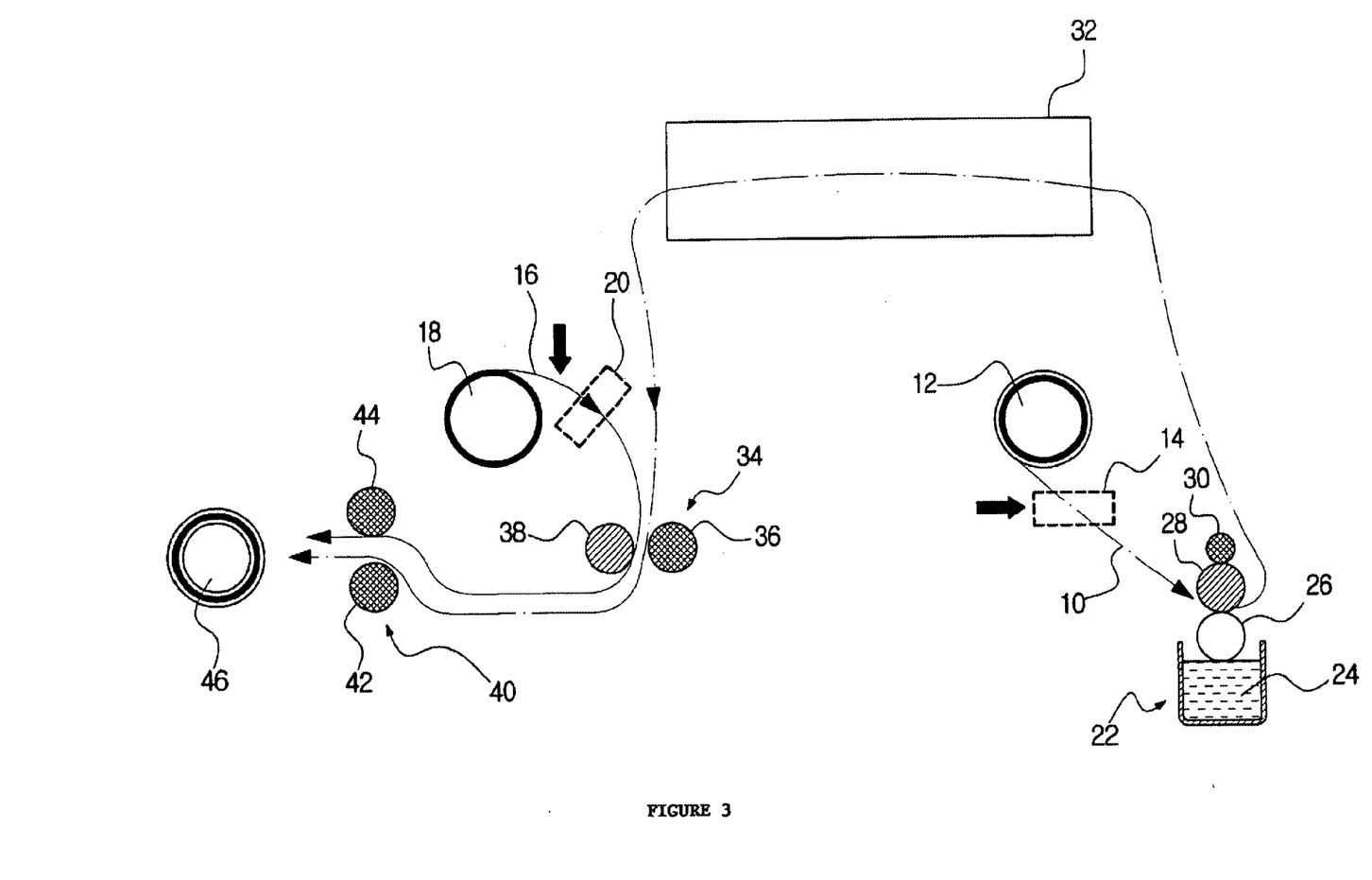
FIG. 3 shows a microporous laminated sheet-producing system according to a first embodiment of the present invention.

FIG. 3 shows a microporous laminated sheet-producing system according to a first embodiment of the present invention. Referring to FIG. 3, the microporous laminated sheet-producing system includes a microporous film-feeding section 12 serving to feed the microporous film 10. The microporous film-feeding section 12 may be formed in a roller form, and in a place following the feeding section, there may be placed a corona treatment section serving to subject the microporous film unwound from the feeding section 12 to corona discharge treatment.

The microporous laminated sheet-producing system also includes a reinforcement-feeding section 18, which is opposed to the microporous film-feeding section 12 and around which reinforcement 16, such as a non-woven fabric web formed of polypropylene, is wound unwindably. Similarly, the reinforcement-feeding section 18 may be formed in a roller shape, and in a place following the feeding section 18, there may be placed a corona treatment section to subject the reinforcement unwound from the feeding section 18 to for corona discharge treatment.

In particular, in the rear of the microporous film-feeding section 12, there is placed an adhesive-applying section 22 for applying an adhesive on the microporous film being unwound from the feeding section 12. The adhesive-applying section 22 is preferably composed of an adhesive tank 24 serving to store the adhesive, an applying roller 26 for applying the adhesive contained in the adhesive tank 24 on the microporous film 10, a pressing roller 28 serving to press the microporous film against the applying roller 26, and an assistant pressing roller 30 serving to push the pressing roller 28 toward the applying roller 26. Preferably, the adhesive-applying roller 26 is formed of a copper plate at its outer surface, the pressing roller 28 is formed of silicon, the assistant pressing roller 30 is formed of a metal.

Meanwhile, following the adhesive-applying section 22, there is placed a drying chamber 32 serving to dry the microporous film 10 applied with the adhesive in the applying section.

Furthermore, in a place following the drying chamber 32, there is placed a laminating section 34 serving to bond the reinforcement unwound from the reinforcement-feeding section 18 to the microporous film 10 discharged from the drying chamber 32. The laminating section 34 includes, for example, a first pressing roller 36 serving to press the film while being in contact therewith, and a second pressing roller 38 serving to press the reinforcement while being in contact therewith.

Also, in order to impart the natural fabrics-like texture to a final product, an embossing section 40 is preferably placed following the laminating section. The embossing section 40 preferably includes two of embossing rollers 42 and 44 that are opposite to each other and serve to compress the laminated microporous film and reinforcement. Preferably, either of the embossing rollers is formed of a metal, and subjected to the embossing finish at its surface to be dull-lustered. Also, another embossing roller is preferably etched by a silicon roller or the sand blasting, and dull-plated.

Finally, in the rear of the laminating section 34 or the embossing section 40, there is placed a winding section 46 serving to collect the laminated sheet passed through the laminating section or the embossing section. This winding section 46 is preferably formed in a roller shape.

Figure 4:
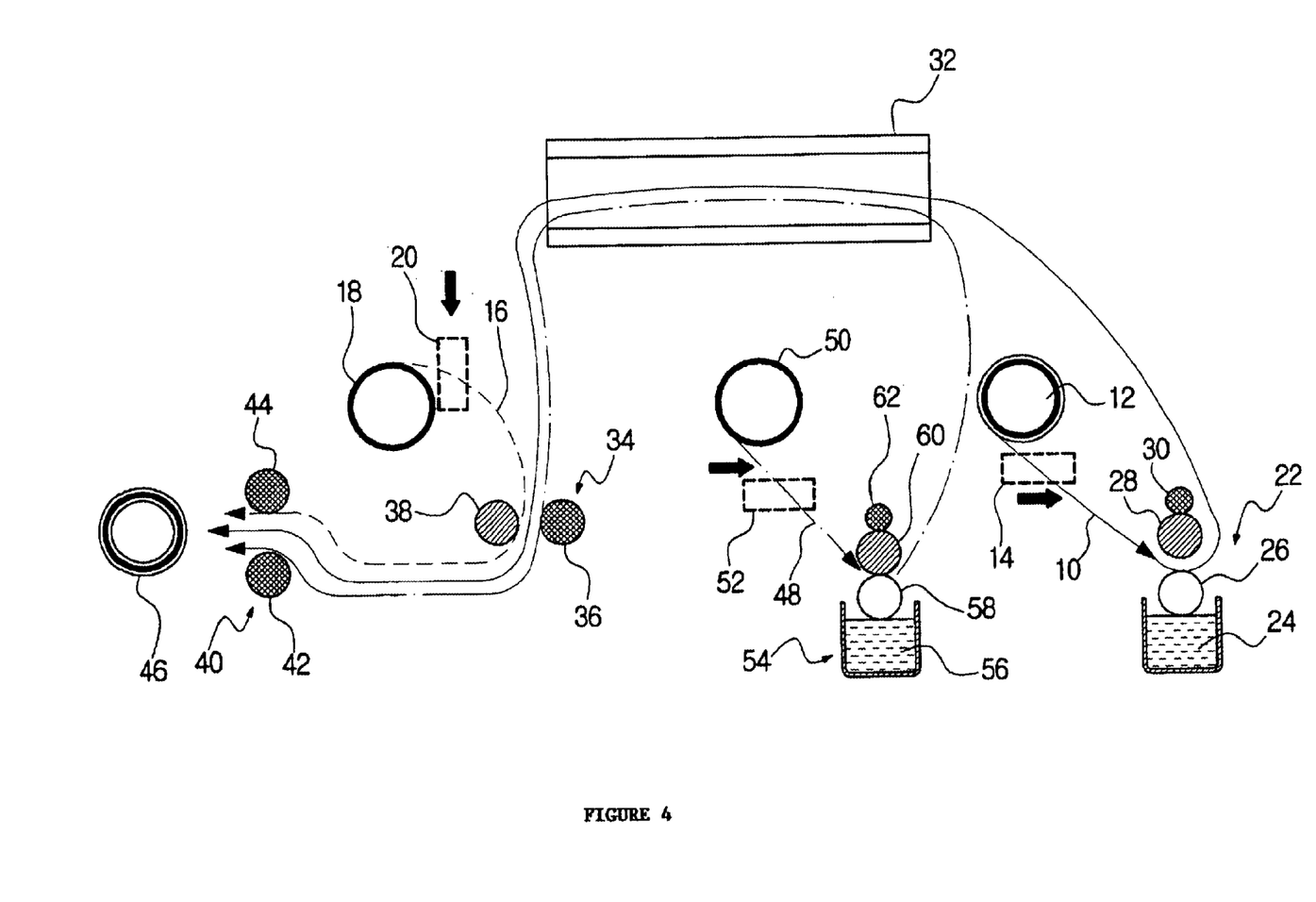
FIG. 4 shows a microporous laminated sheet-producing system according to a second embodiment of the present invention.

FIG. 4 shows a microporous laminated sheet-making system according to a second embodiment of the present invention. In order to prepare a three-layer microporous laminated sheet, the system in FIG. 4 further includes a second reinforcement-feeding section and a second adhesive-applying section, additionally to the sections in the two-layer microporous laminated sheet-producing system according to the first embodiment as shown in FIG. 3.

More specifically, the system shown in FIG. 4 further includes a second reinforcement-feeding section 50. This section 50 serves to feed a second reinforcement 48 of a non-woven fabric form, which corresponds to the microporous film 10 in the producing system according to the first embodiment shown in FIG. 3. Also, this second reinforcement-feeding section 50 may be formed in a roller form, and following this, there may, of course, be placed a corona treatment section serving to subject the reinforcement 48 unwound from the feeding section 50 to corona discharge treatment.

Also, in the rear of the reinforcement-feeding section 50, there is placed a second adhesive-applying section 54 serving to apply an adhesive on the second reinforcement unwound from the feeding section 50. This adhesive-applying section 54 is preferably composed of an adhesive tank 56 containing an adhesive, an applying roller 58 for applying the adhesive contained in the adhesive tank 56 on the reinforcement unwound from the feeding section, a pressing roller 60 serving to press the second reinforcement against the applying roller, and an assistant pressing roller 62 serving to push the pressing roller 60 toward the applying roller 58. Preferably, the adhesive-applying roller 58 is formed of a copper plate at its outer surface, the pressing roller 60 is formed of silicon, the assistant pressing roller 62 is formed of a metal.

By the structure of the system according to the second embodiment of the present invention, one side of the microporous film 10 is bonded to the reinforcement fed from the reinforcement-feeding section, and the other side of the microporous film 10 is applied with the second reinforcement fed from the second reinforcement-feeding section 50, thereby being capable of making the three-layer microporous laminated sheet.

Figure 5:
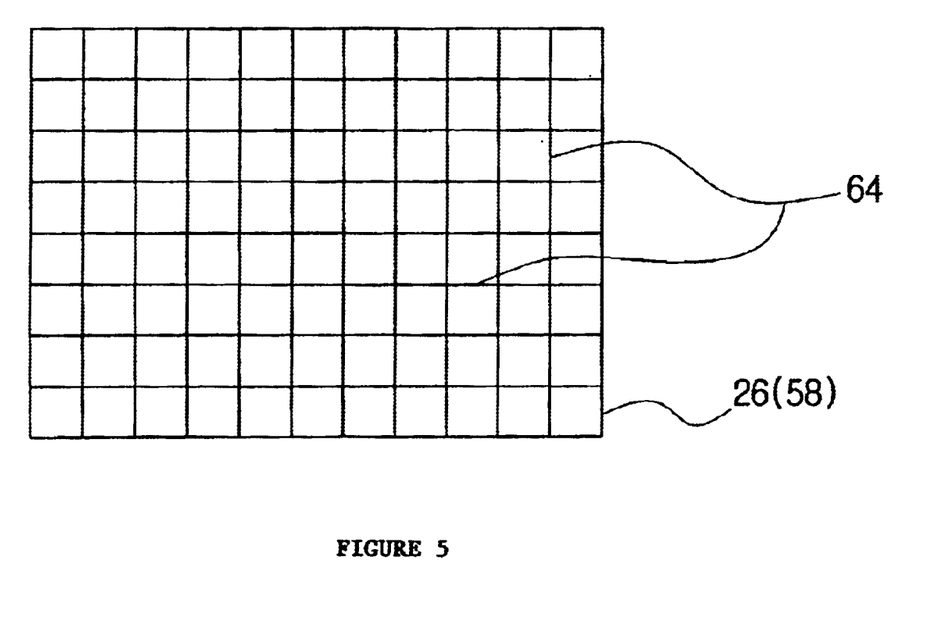
FIG. 5 is a top view showing an applying roll in an adhesive-applying section used in a laminated sheet-producing system according to the present invention.
Figure 6:
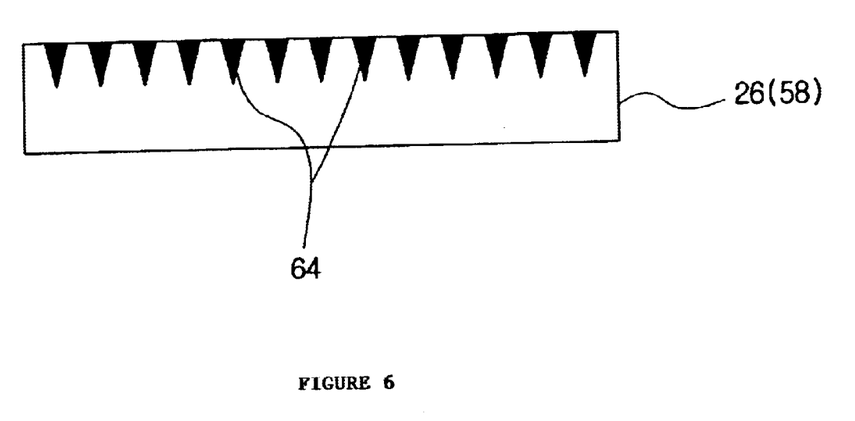
FIG. 6 is a cross-sectional view of FIG. 5.

In particular, the applying rollers 26 and 58 in the respective applying sections 22 and 54 in the system according to the present invention have a plurality of adhesive-receiving grooves 64 as shown in FIGS. 5 and 6. These adhesive-receiving grooves are formed for the purpose of receiving the adhesive from the adhesive tanks 24 and 56 and then applying it on the non-woven fabric web or the microporous film. These receiving grooves 64 may have a desired depth and preferably has a lattice shape. Preferably, the respective applying rollers 26 and 58 are formed of a copper plate, and in the applying roller made of the copper plate, there is formed the respective adhesive-receiving grooves 64 in an etching manner. The depth of, and the spacing between the receiving grooves may be set suitably depending on physical properties of the microporous film and reinforcement on which the adhesive is applied, as well as on a capacity of the production system.

Figure 7:
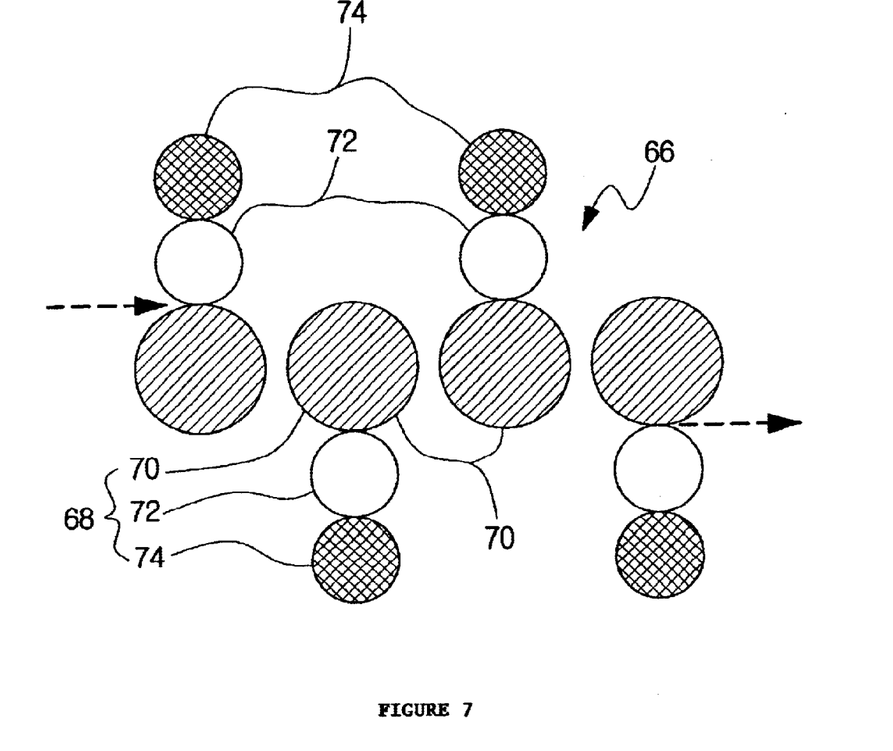
FIG. 7 is a lateral view showing a stretching section in a microporous film-producing section, which can be added to a laminated sheet-producing system according to the present invention.

The system according to the present invention may further include a microporous film-production system, which includes an improved microporous film-stretching section 66 as shown FIG. 7. The stretching section 66 of the microporous film-producing system includes plural sets of rollers 68. The respective sets of rollers 68 include a base roller 70 with which one side of the microporous film is in contact; a support roller 72 opposite to the base roller 70, with which the other side of the microporous film is in contact; and a retainer roller 74 serving to maintain and restrict the support roller 72 at a suitably pushed state toward the base roller 70. Preferably, the base roller 70 is tungsten-coated at their surface, the support roller 72 is formed of aluminum oxide-containing silicon, and the retainer roller 74 is formed of a chrome-plated metal.

In particular, the rotation velocity of the respective sets of rollers 68 is preferably set in such a manner that it is progressively increased from the roller set at an input side of the microporous film toward the roller set at the output side. This can transport while drawing the microporous film entering the stretching section 66.

Hereinafter, a laminated sheet-producing method using the system structured as described, and a laminated sheet manufactured thereby, will be described in detail.

First, the microporous film used in the laminated sheet according to the present invention is formed from a resin composition comprising 30 to 70% by weight of a polyolefin resin, 1 to 70% by weight of alpha-olefin copolymer, and 20 to 70% by weight of an inorganic filler. The reinforcement serving to reinforce the microporous film is preferably formed of a polypropylene-based non-woven fabric.

More specifically, the polyolefin resin used in the microporous film can be selected from a copolymerized resin of ethylene and alpha-olefin, low-density polyethylene resin, and a copolymer or copolymerized resin of alpha-olefins. For example, if the copolymerized resin of ethylene and alpha-olefin is less than 0.865 in density, it is then increased in its melt viscosity during extrusion to increase an extrusion load, so that the workability and breathability can be decreased. On the other hand, if the density is more than 0.959, the resulting film is decreased in its impact strength and becomes coarse at its surface, thereby reducing the product quality and limiting its use. As a result, the density of the resin is preferably in the range of 0.865 to 0.959. Also, a melt index of the resin is preferably 1 to 10. As alpha-olefin in the copolymerized resin of ethylene and alpha-olefin, there may be used butene, hexene, octene, octenic metallocene and the like. This alpha-olefin is preferably used in a power state other than a pellet state so as to be reduced in the extrusion load and to be dispersed effectively. Preferably, low-density polyethylene has a density of 0.900 to 0.930, and a melt index of 1.0 to 10.0, and more preferably a melt index of 3.0 to 7.0. Also, the alpha-olefin copolymer preferably has a density of 0.890 to 0.930, and a melt index of 2.0 to 5.0.

Meanwhile, in blending the polyolefin resin as described above, increasing a content of low density ethylene improves an extrusion-processability of the microporous film, but reduces the physical properties of the film, particularly tensile strength and tearing strength. For this reason, the content of low-density polyethylene must be increased within a limited range. Moreover, increasing a content of the alpha-olefin copolymer to a desired extent can effectively improve a dispersion effect of the inorganic filler as well as a pinhole phenomenon caused by the inorganic filler. Particularly, this increase in the alpha-olefin copolymer content can increase a reactivity of the film with a reactive polyurethane adhesive used in a laminating process of the present invention, thereby increasing an adhesion between the microporous film and the reinforcement. Accordingly, the microporous film and the reinforcement can be maintained at a strongly bonded state even when cleaning by, such as the water cleaning or dry-cleaning.

Also, adding the polyolefin resin at a suitable amount can make the microporous film surface highly, soft and can provide a product having an excellent flexibility and an excellent resistance to impact from the external.

Meanwhile, the alpha-olefin copolymer used in the microporous film for the production of the laminated sheet according to the present invention is, preferably, 60° C. or above in softening temperature, 1.0 to 5.0 in melt index, and 0.880 to 0.920 in density. These established ranges for the respective properties are the requisites to be satisfied such that the olefin resins having different properties are dispersed satisfactorily in each other, thereby being melted without occurring a phase separation between the olefin resins. For example, if a softening point of olefins is excessively high, dispersion of olefins can be adversely affected. Also, if the melt index and density of olefins are out of the above ranges, it was found that the requisites of the microporous film, such as porosity, tensile strength, tearing strength, etc., were adversely affected.

The resin composition for the production of the microporous film is, for example, extruded by a uniaxial extruder, cast by a casting roller through a die, and cooled, thereby being formed into a sheet-shaped microporous film. Specifications of the uniaxial casting extruder may be determined depending on a screw diameter and a die width. For example, in the case of a casting extruder having a 130 mm screw diameter and a 2500 mm die width, the screw preferably has a length-to-diameter ratio of 25:1 to 38:1, the compression ratio is preferably in the range of 2.0 to 5.0. Also, in the case of a casting extruder including a mixing zone, it is preferred that the ratio of length to diameter is 34:1, and the compression ratio is 3.0. This provides the optimum condition for extrusion of compounds containing an amount of inorganic fillers, and particularly, for extrusion of the microporous film for the preparation of a laminated sheet. Examples of the die used in the extrusion process include T-die, fish-tail die, and coat-hanger die. For example, in the case of compounds containing an inorganic filler having an extreme viscosity change, their melt viscosity is significantly higher than that of common pure resins. Thus, T-die is preferably used to control a thickness of the microporous film to a uniform level. Here, to improve die build-up, die-drop or die line phenomenon caused by low molecular materials, the inside of T-die is preferably plated with chrome and then with tungsten or silica.

The microporous film thus formed to have a sheet shape is fed in-line into a stretching section, thereby being stretched in the longitudinal direction. At this time, the production of the microporous film is influenced by the surface condition and structure of the stretching roller and rubber roller, and a temperature and rotation velocity of the stretching roller. To stretch more uniformly the sheet-shaped microporous film, a preheating process of the film is preferably carried out prior to the stretching process. This preheating process is carried out at a temperature of about 40° C. to 100° C.

Moreover, to prevent a partial stretching deviation and maintain excellent mechanical strengths and properties of the microporous film, it may be stretched using a stretching section as shown in FIG. 7. In such a stretching section, the base roller 70 of the respective roller sets 68 is plated with tungsten and dull-lustered at its surface. Thus, in the stretching process of the microporous film using this stretching process, the microporous film is prevented from being slide partially when passing between the base roller 70 and the support roller 72, thereby being capable stretching the microporous film having a generally uniform width.

Also, the support roller 72 is formed of aluminum oxide-containing silicon, and pressed by the retainer roller 74 plated with chrome. For this reason, the microporous film passing between the base roller 70 and the retainer roller 72 is prevented from the fine slide and the partial non-stretching, regardless of its thickness, thereby being capable of forming a microporous film having a uniform thickness.

Furthermore, by being stretched continuously by the respective roller sets having a different rotation velocity, the microporous film is more thoroughly stretched and thus may have a uniform width. In particular, the microporous film stretched using the above stretching section is about 30% higher in the stretching effect than that of the prior stretching section. Thus, in the case of an uniaxially stretched microporous film, a reduction phenomenon in transverse tensile strength, longitudinal tearing strength, and impact strength, etc. can be improved that occur by a high elongation percentage.

Once the stretching process of the microporous film as described above is completed, the resulting microporous film is subjected to a sufficient annealing. This annealing is carried out for the purpose of preventing a molecular structure of the film from being returned to the longitudinally oriented structure due to the forced stretching as described above, thereby maintaining the stable molecular structure and breathability of the film. In this case, considering a melting point of the polyolefin resin, the annealing is preferably carried out at a temperature of 50 to 130° C., and more preferably, at a temperature of 90 to 120° C. At this temperature, a shrinkage percentage of the microporous film can be decreased suitably depending on its use.

Next, the microporous film is cooled. In this cooling process, the microporous film is cooled as slow as possible so as to maintain its mechanical properties, thereby finishing its production. In the prior art, the chrome-plated cooling roll is generally used. However, the present invention employs a cooling roll, which is plated with tungsten at its surface and dull-lustered. Also, the present invention employs a silicon roll added with aluminum oxide, which is pushed toward the cooling roll. For this reason, the present invention can improve a non-uniform phenomenon along the width and length directions of the film occurring due to the rapid shrinkage of the microporous film passing through the cooling roll after the annealing process. In addition, this makes possible the production the high quality microporous film having a soft surface and a high haze. The reason why the microporous film is cooled slowly is that crystallization of the microporous film made of the polyolefin resin is prevented from being influenced by the cooling process, so that a breathability, haze, and texture, etc., that are important factors of the microporous film for the laminated sheet, are not affected adversely.

Then, to improve the printability or adhesive property of the finished microporous film, a cross-section or both sides of the microporous film may be optionally subjected to in-line corona discharge treatment or plasma treatment.

Meanwhile, in making the microporous film as described above, various components such as additives can be used. Also, a phenol or phosphorous antioxidant, a processing stabilizer, or activators such as zinc stearate, calcium stearate and a metal salt of stearic acid may be used. If the laminated sheet is used, for example, in an industrial wear, a packing material for fur or wool, a house wrap or roofing for preventing a dewing of buildings, or a packing material for fruit crops, there are preferably added an ultraviolet stabilizer (antioxidant), a thermal stabilizer and the like to the microporous film used in the laminated sheet. In some cases, industrial wears are preferably added with an anti-static agent, a flame retardant, and an antioxidant, etc.

The microporous film formed as described above is wound around the microporous film-feeding section 12 in the system according to, for example, the first embodiment shown in FIG. 3. At the initial or ready state of this system, of course, the reinforcement-feeding section is wound with a non-woven fabric type reinforcement 18 formed of polypropylene.

Where the system is operated at this initial state, the microporous film 10 unwound from the microprous film-feeding section 12 is subjected to corona discharge treatment in a corona treatment section, and then fed into the adhesive-applying section in which an adhesive is applied on one side of the microporous film 10 by the applying roller 26.

The microporous film 10 so applied with the adhesive in the applying section 22 is transported into the drying chamber 32 in which it is dried to a desired level.

Next, the microporous film 10 discharged from the drying chamber 32 is entered into the laminating section 34 together with the reinforcement 16 fed from the reinforcement-feeding section 18. In the laminating section 34, the microporous film 10 and the reinforcement 16 are bonded and laminated to each other by a first pressing roller 36 and a second roller 38 of the laminating section 34.

Subsequently, to impart a natural fabric-like texture to the laminated sheet, the laminated sheet consisting of the microporous film 10 bonded to the reinforcement 16 is entered into the embossing section 40, and passed between the embossing rollers 42 and 44, thereby being embossed.

Finally, the laminated sheet passed through the laminating section 34 or the embossing section 40 is wound around the roller-shaped winding section 46 and fed into a succeeding treating process or a cutting process.

Figure 8:
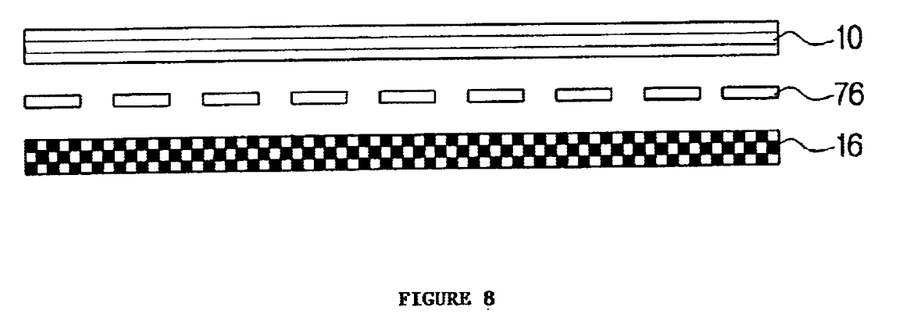
FIG. 8 is an enlarged cross-sectional view showing the structure of a laminated sheet produced by a laminated sheet-making system of FIG. 4.

The microporous film 10 and the reinhrcement 16 in the laminated sheet produced as described above are bonded to each other by the adhesive 76, as shown in FIG. 8. In this case, as the adhesive is applied in the linear or lattice shape by the lattice-shaped receiving grooves formed in the applying roller 26 of the adhesive-applying section as shown in FIGS. 5 and 6, it will not close micropores formed in the microporous film 10 and the reinforcement 16 so that a breathability of the laminated sheet can be maintained stably.

Meanwhile, with respect to a laminatecd sheet-producing method using the system according to the second embodiment of the present invention, the microporous film 10 unwound from the feeding section 10, and the reinforceraent 48 unwound from the second reinforcement-feeding section 50, are simultaneously entered into the respective applying sections 22 and 54. The microporous film 10 and the second reinforcement 48 so entered into the respective applying sections 22 and 54 are applied with the adhesive by the applying rollers 26 and 58 of the respective sections 22 and 54.

The microporous film 10 and the second reinforcement 16 so applied with the adhesive in the respective applying sections are transported into a drying chamber 32 in which they are dried to a desired extent.

Next, the microporous film 10 and the second reinforcement 48 discharged from the drying chamber 32 are entered into the laminating section 34 together with the reinforcement fed 16 from the reinforcement-feeding section 18, as in the system of the first embodiment. In the laminating section 34, they are pressed against one another by the first and second pressing roller 36 and 38 of the laminating section 34, bonded and laminated to each another. At this time, one side of the microporous film 10 is bonded to the reinforcement 16, while the other side is bonded to the second reinforcement 48. As a result, the three-layer laminated sheet is prepared, in which the reinforcements 16 and 48 are bonded to both sides of the microporous film.

Subsequently, to impart a natural fabric-like texture to the laminated sheet, the laminated sheet consisting of the microporous film 10 bonded to the reinforcements 16 and 48 is entered into the embossing section, and passed between the embossing rollers 42 and 44, thereby being embossed.

Finally, the laminated sheet passed through the laminating section 34 or the embossing section 40 is wound around the roller-shaped winding section and fed into a succeeding treating process or a cutting process.

Figure 9:
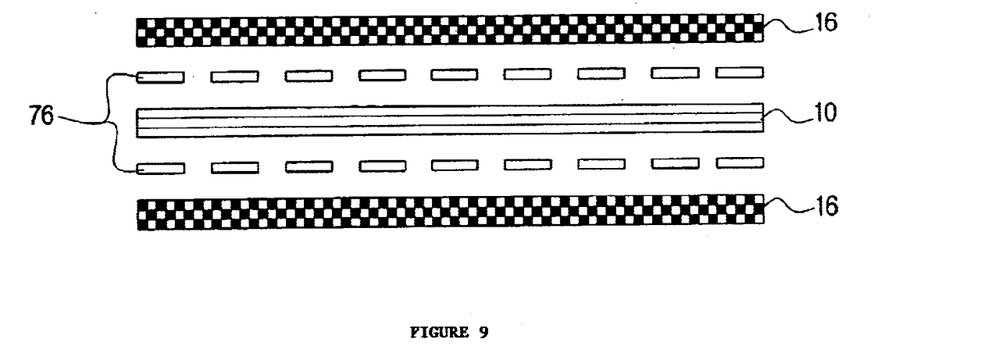
FIG. 9 is an enlarged cross-sectional view showing the structure of a laminated sheet produced by a laminated sheet-MAKING system of FIG. 5.

In the laminated sheet thus produced, as shown in FIG. 9, the adhesive 76 is applied on both sides of the microporous film 10 to have a linear or lattice shape, and the reinforcements 16 and 48 are bonded to both sides of the microporous film 10 applied with the adhesive. As a result, pores formed in the microporous film 10 are normally retained, so that a breathability of the microporous film 10 can be retained stably and also the strength thereof can be increased.

The laminated sheets produced as described above were tested for moisture permeability according to various parameters. Test results are described below. Physical properties of the respective test sample, i.e., tensile strength, tearing strength, adhesion and moisture permeability, were evaluated according the following conditions.

1) Tensile at break and elongation at break were measured for samples taken transversely or longitudinally from films manufactured by a method according to ASTM D 882D.

A width of the test samples was 2.5 mm; a grip distance 50 mm, and a grip speed 500 mm/min.

2) Tearing strength was measured for samples taken longitudinally from a film manufactured by a method according to ASTM D 1004. A grip speed was 500 mm/min, and the film test sample had a dimension of 60 mm×70 mm and measured in a state where it was cut at its central portion by 30 mm and fixed to the grip.

Adhesion (peel strength) was measured for samples taken longitudinally from a film manufactured by an ASTM method. A width of the test samples was 25 mm; a grip distance 50 mm, and a grip speed 500 mm/min.

Moisture permeability was expressed by the amount of moisture (gram) passes for 24 hours through 1 m² of a film manufactured by ASTM E 96-96. 50 g of anhydrous calcium chloride has put in an aluminum cup on which the microporous film or the microporous laminated sheet has put to close the cup. Then, the cup was exposed to a thermohydrostatic chamber of about 37.8° C. and a 90% relative humidity, for about 2 hours, and a hygroscopic degree of calcium chloride caused by passage of moisture through was measured. The measurement results for about 2 hours were recorded in terms of 24 hours. Also, an area of the film was recorded in terms of 1 m².

TEST EXAMPLE 1

Table 1 below shows the relation of a viscosity of adhesive and an (peeling strength) of the film with a moisture permeability of the film. A moisture permeability of the film used in the test was 13,000 g.

TABLE 1

| Adhesive viscosity (sec.) | Spacing between receiving grooves on applying roller (mm) | Depth of receiving grooves on applying roller (μm) | Width of receiving grooves on applying roller (mm) | Adhesion (peel strength) (g.f/inch) | Moisture permeability (g/24 hr.m³) |
|---|---|---|---|---|---|
| 15 | 3 | 100 | 0.25 | 350–450 | 5,000–5,500 |
| 20 | 3 | 100 | 0.25 | 550–650 | 6,000–6,500 |
| 25 | 3 | 100 | 0.25 | 700–800 | 6,500–7,000 |
| 30 | 3 | 100 | 0.25 | 900–1000 | 8,000–8,500 |
| 35 | 3 | 100 | 0.25 | 1100–1200 | 8,300–9,000 |

TEST EXAMPLE 2

Table 2 below shows the relation of an adhesion (peeling strength) of the film with a moisture permeability of the film according to an etching space of the applying roller. A moisture permeability of the film used in the test was 13,000 g, a viscosity of an adhesive was 30 seconds, and a width between receiving grooves on the applying roller was 0.25 mm.

TABLE 2

| Spacing between receiving grooves on applying roller (mm) | Depth of receiving groove on applying roller (μm) | Adhesion (peel strength) (g · f/inch) | Moisture permeability (g/24 hr · m²) |
|---|---|---|---|
| 4 | 100 | 250 | 11,000–12,000 |
| 3.75 | 100 | 350 | 10,000–11,000 |
| 3.5 | 100 | 400 | 8,500–9,500 |
| 3 | 100 | 550 | 7,500–8,500 |
| 2 | 100 | 750 | 6,000–7,000 |

TEST EXAMPLE 3

Table 3 below shows the relation of an adhesion (peeling strength) of the film with a moisture permeability of the film according to a depth of receiving grooves on the applying roller. A moisture permeability of the film used in the test was 13,000 g, an adhesive viscosity was 30 seconds, and a width between receiving grooves on the applying roller was 0.25 mm.

TABLE 3

| Spacing between receiving grooves on applying roller (mm) | Depth of receiving groove on applying roller (μm) | Adhesion (peel strength) (g · f/inch) | Moisture permeability (g/24 hr · m²) |
|---|---|---|---|
| 3 | 60 | 100–200 | 11,000–12,000 |
| 3 | 70 | 150–180 | 10,000–11,000 |
| 3 | 80 | 200–230 | 8,500–9,500 |
| 3 | 90 | 350–400 | 7,500–8,500 |
| 3 | 100 | 500–550 | 6,000–7,000 |

TEST EXAMPLE 4

Table 3 below shows the relation of a viscosity of adhesive and an adhesion (peel strength) of the film with a moisture permeability of the film according to a heating temperature of the adhesive tank. A moisture permeability of the film used the test was 13,000 g, an viscosity of adhesive at room temperature 30 seconds, and a width between receiving grooves on the applying roller 0.25 mm, a depth of receiving grooves of the applying roller 100 μm, and a width of receiving grooves of the applying roller 0.25 mm.

TABLE 4

| Heating temperature of adhesive tank (° C.) | Viscosity of adhesive (sec) | Adhesion (peel strength) (g · f/inch) | Moisture permeability (g/24 hr · m$^2$) |
| --- | --- | --- | --- |
| 5 | 25 | 700–800 | 6,500–7,000 |
| 10 | 23 | 750–850 | 6,000–6,500 |
| 15 | 21 | 800–900 | 5,800–6,350 |
| 20 | 20 | 850–950 | 5,500–6,000 |

TEST EXAMPLE 5

Table 5 below shows the relation of an adhesion (peel strength) of the film with a moisture permeability of the film according to a content of alpha-olefin copolymer in the microporous film. In this test, a spacing between the receiving grooves on the applying roller was 0.3 mm, a depth of the receiving roller 100 μm, a width of the receiving groove 0.25 mm, and a heating temperature of the adhesive tank 15° C.

TABLE 5

| Alpha-olefin copolymer content (% by wt) | Adhesion (peel strength) (g · f/inch) | Moisture permeability (g/24 hr · m$^2$) |
| --- | --- | --- |
| 0 | 180–230 | 7,800–8,300 |
| 5 | 250–280 | 10,000–10,500 |
| 10 | 370–470 | 9,000–9,800 |
| 15 | 450–550 | 8,200–8,700 |
| 20 | 630–680 | 7,500–8,000 |
| 25 | 720–800 | 6,500–7,000 |

TEST EXAMPLE 6

Table 6 below shows the relation of a surface area of the microporous film with its adhesion (peel strength). In this test, a spacing between the receiving grooves on the applying roller was 3 mm, a depth of the receiving roller 100 μm, a moisture permeability of the microporous film 13,000 g, a width of the receiving groove 0.25 mm, and a viscosity of the adhesive. To measure the surface area of the microporous film, Surfcorder SE 40 was used at a drive speed

TABLE 6

| Surface area of microporous film | Adhesion (peel strength) (g · f/inch) |
| --- | --- |
| Ra: 2.1 μm/Rmax: 16.5 μm/Rz: 14.6 μm | 850–1150 |
| Ra: 5.1 μm/Rmax: 29.8 μm/Rz: 23.7 μm | 350–380 |
| Ra: 6.0 μm/Rmax: 40.0 μm/Rz: 25.0 μm | 280–320 |
| Ra: 7.3 μm/Rmax: 56.7 μm/Rz: 25.9 μm | 250–270 |

TEST EXAMPLE 7

Table 7 below shows the relation of a corona treatment level of the microporous film with its adhesion (peel strength). In this test, a spacing between the receiving grooves on the applying roller was 3 mm, a depth of the receiving roller 100 μm, a moisture permeability of the microporous film 13,000 g, a width of the receiving groove 0.25 mm, and a viscosity of the adhesive 25 seconds.

TABLE 7

| Corona treatment level (dyne) | Adhesion (peel strength) |
| --- | --- |
| Control | 120–150 |
| 35 | 350–380 |
| 40 | 550–650 |
| 45 | 750–820 |
| 50 | 850–900 |

As evident from the test examples, the microporous film prepared from the resin composition containing an alpha-olefin copolymer resin was high in tensile at break, elongation at break and haze, and excellent in breathability and flexibility, as compared to other resin composition not containing the alpha-olefin copolymer. In addition, if a content of the alpha-olefin copolymer were increased within the limited range, the tensile at break, elongation at break, and moisture permeability were increased, whereas if the alpha-olefin copolymer content is out of the limited range, the moisture permeability was reduced.

As a result, the microporous laminated sheet produced by the system and method according to the present invention includes the microporous film formed from the resin composition comprising 30 to 70% by weight of the polyolefin resin, 1 to 70% by weight of the alpha-olefin copolymer and 20 to 70% by weight of the inorganic filler; the polypropylene-based reinforcement serving to reinforce the microporous film; and the adhesive interposed between the microporous film and the reinforcement by being applied on the microporous film and/or reinforcement in a lattice or linear shape by the gravure printing method. By this adhesive applied in the linear or lattice shape, the microporous film and the reinforcement are bonded to each other in uniform and stable manners throughout their bonding sides. Accordingly, the present invention is advantageous in that the microporous film is maintained stably in the breath ability while being excellent in the adhesion, thereby improving the product quality. Also, the present invention advantageously prevents an excessive consumption of the adhesive to provide an improvement in economics. In addition, the microporous laminated sheets according to the present invention have utilities in various applications.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A microporous laminated sheet-producing system for bonding a microporous film to a reinforcement, comprising:
   a microporous film-feeding section serving for feeding the microporous film;
   a reinforcement-feeding section form which the reinforcement is unwound to be supplied to the microporous film;
   an adhesive-applying section for applying an adhesive in a lattice shape on the microporous film fed from the microporous film-feeding section;
   a drying chamber for drying the microporous film applied with the adhesive;
   a laminating section for bonding the microporous film discharged from the drying chamber and the reinforcement to each other to form a laminated sheet; and
   a microporous film-producing system including a stretching section including plural sets of rollers that have a rotation velocity progressively increasing from an input side of the microporous film toward an output side of the microporous film, wherein each of the roller sets of the microporous film-producing system comprises:
  a base roller being in contact with one side of the microporous film;
  a support roller opposite the base roller the support roller being in contact with the other side of the microporous film; and
  a retainer roller for maintaining and restricting the support roller at a state pressed against the base roller; and wherein the adhesive-applying section comprises:
  an adhesive tank including an adhesive;
  an applying roller for applying the adhesive included in the adhesive tank, on the microporous film;
  a pressing roller for pressing the microporous film against the applying roller; and
  an assistant pressing roller for pushing the pressing roller toward the applying roller.

2. The system of claim 1, wherein the base roller is coated with tungsten on a surface, the support roller is formed from aluminum oxide-containing silicon, and the retainer roller is formed of a chrome-plated metal.

* * * * *